(12) United States Patent
Bhandarkar et al.

(10) Patent No.: US 7,100,400 B2
(45) Date of Patent: *Sep. 5, 2006

(54) MANUFACTURE OF SILICA BODIES USING SOL-GEL TECHNIQUES

(75) Inventors: Suhas Bhandarkar, Alfred, NY (US); Yoram De Hazan, South Plainfield, NJ (US); John Burnette MacChesney, Lebanon, NJ (US); Thomas Edward Stockert, Milburn, NJ (US)

(73) Assignee: Furukawa Electric NA, Norcross, GA (US)

( * ) Notice: Subject to any disclaimer, the term of this patent is extended or adjusted under 35 U.S.C. 154(b) by 449 days.

This patent is subject to a terminal disclaimer.

(21) Appl. No.: 10/378,769

(22) Filed: Mar. 4, 2003

(65) Prior Publication Data

US 2004/0172979 A1    Sep. 9, 2004

(51) Int. Cl.
*C03B 37/016* (2006.01)
*C03C 3/00* (2006.01)

(52) U.S. Cl. .......................... 65/395; 65/17.2; 264/621; 501/12

(58) Field of Classification Search ................ 65/17.2, 65/395, 430, 435, 440; 264/64, 621; 501/12
See application file for complete search history.

(56) References Cited

U.S. PATENT DOCUMENTS

| | | | | |
|---|---|---|---|---|
| 5,562,752 A | * | 10/1996 | Fleming, Jr. | 65/384 |
| 5,914,437 A | * | 6/1999 | Chandross et al. | 65/17.2 |
| 6,263,706 B1 | * | 7/2001 | Deliso et al. | 65/397 |
| 6,296,826 B1 | * | 10/2001 | Fujinoki et al. | 423/335 |
| 6,333,284 B1 | * | 12/2001 | Otsuka et al. | 501/54 |
| 6,343,490 B1 | * | 2/2002 | Alonzo et al. | 65/395 |
| 6,386,002 B1 | * | 5/2002 | Bhandarkar et al. | 65/395 |
| 6,442,977 B1 | * | 9/2002 | Bhandarkar et al. | 65/395 |
| 6,457,329 B1 | * | 10/2002 | Bhandarkar et al. | 65/17.2 |
| 6,571,582 B1 | * | 6/2003 | Bhandarkar et al. | 65/395 |
| 2002/0090335 A1 | * | 7/2002 | Harada et al. | 423/598 |
| 2002/0108399 A1 | * | 8/2002 | Bhandarkar et al. | 65/17.2 |
| 2002/0194878 A1 | * | 12/2002 | Jourdier et al. | 65/397 |
| 2003/0131633 A1 | * | 7/2003 | Jeong et al. | 65/504 |

FOREIGN PATENT DOCUMENTS

EP          1251106 A2 *  10/2002

* cited by examiner

*Primary Examiner*—Carlos Lopez

(57) ABSTRACT

The use of large dense vitreous spherical (LDVS) silica powders for making sol-gel silica bodies has been found to have important advantages. Among these are higher gel strength, higher silica loading, more rapid aging and drying of the gel, a reduction in the amount of organic additives leading to reduced process time required for organic burn-off, and easier removal of contaminant particles due to their larger size. It was also discovered that combining LDVS particles with conventional non-spherical, lower density, aggregate particle mixtures, further improves the process.

16 Claims, 5 Drawing Sheets

MANUFACTURE OF SILICA BODIES USING SOL-GEL TECHNIQUES

FIELD OF THE INVENTION

This invention relates to sol-gel processes for making large sol-gel bodies. It is especially applicable to techniques for preparing optical fiber preforms.

BACKGROUND OF THE INVENTION

A variety of methods have been suggested for the manufacture of high-silica content glass articles, such as the single and double dispersion processes described by D. W. Johnson, et al. in Fabrication Of Sintered High-Silica Glasses, U.S. Pat. No. 4,419,115, and the process described by D. W. Johnson, et al in Sintered High-Silica Glass And Articles Comprising Same, U.S. Pat. No. 4,605,428. Uses of high-silica content include the fabrication of glass rods for use as preforms in the manufacture of optical fibers as suggested by F. Kirkbir, et alii, U.S. Pat. No. 5,254,508 for a Sol-gel Process For Forming A Germania-doped Silica Glass Rod, and the fabrication of secondary cladding tubes for use during fabrication of an optical fiber by a sol-gel process. Although sol-gel processes enable fabrication of glass objects at lower cost than other processes, N. Matsuo, et alii, in U.S. Pat. No. 4,680,046 for a Method Of Preparing Preforms For Optical Fibers, among others, has noted that it is difficult to provide a glass article that is large enough to be used as a preform for optical fibers.

Considering that the functioning part of an optical fiber (the core and inner cladding carrying 99+% of the optical energy) typically consists of but 5% of the mass, a significant part of this effort has concerned structures providing for overcladding of such inner portion. State of the art manufacture often makes use of an inner portion constituting core and inner clad region as fabricated by Modified Chemical Vapor Deposition, or, alternatively, by soot deposition in Outside Vapor Deposition or Vapor Axial Deposition. This core rod may be overclad by material of less demanding properties, and, consequently, may be produced by less costly processing. Overcladding may entail direct deposition on the core rod, or may result from collapsing an encircling tube. Such "overcladding" tubes have been produced from soot or fused quartz. Making very large bodies of soot require extensive processing, and large bodies of fused quartz are expensive.

It has been recognized that significant economies may be realized by fabricating overcladding tubes by sol-gel techniques. This well-known procedure is described, for example, in J. Zarzycki, "The Gel-Glass Process", pp. 203–31 in Glass: Current Issues, A. F. Wright and J. Dupois, eds., Martinus Nijoff, Boston, Mass. (1985). Sol-gel techniques are regarded as potentially less costly than other known preform fabrication procedures. While sol-gel fabrication of overcladding tubes, and other optical glass components, has met with considerable success, improvements are continually sought.

From the earliest proposals for making large monolithic bodies of glass using sol gel techniques it was recognized that the sol gel process by its nature results in significant shrinkage from the gel state to the solid glass state. When the shape of the body and the overall dimensions are important, this presents a drawback to sol gel methods. Efforts to control the amount of shrinkage usually focus on reducing the water content of the sol. This is often expressed as the loading factor, i.e. the ratio of solid (glass powder) to liquid (water). Recently, we have had success in increasing the loading factor by using relatively large glass particles, and particles having spherical shape. Loading factors of over 75% can be obtained. See U.S. patent application Ser. No. 09/838,727, filed Apr. 19, 2001, which is incorporated herein by reference.

Another persistent problem in making very large sol-gel bodies, e.g. greater than 5 Kg, for state of the art optical fiber drawing is cracking of the gelled body. Cracking may occur during drying or handling of the gelled body prior to consolidation. See for example, T. Mori, et al, "Silica Glass Tubes By New Sol-Gel Method", J. Non-Crystalline Solids, 100, pp. 523–525 (1988), who describe the cracking problem, and recommend modification of the starting mixture and of the gel forming process, both of which are involved and expensive. The cracking problem is explained in a paper by Katagiri and Maekawa, J. Non-Crystalline Solids, 134, pp.183–90, (1991) which states, "One of the most important problems in the sol-gel preparation method for monolithic gels is avoidance of crack formation which occurs during drying". A 1992 paper published in the Journal of Material Science, vol. 27, pp. 520–526 (1992) is even more explicit: "Although the sol-gel method is very attractive, many problems still exist, as pointed out in Zarzycki. Of these problems, the most serious one is thought to be the occurrence of cracks during drying of monolithic gel". The reference then reviews remedies, e.g. hypercritical drying procedures and use of chemical additives such as N,N dimethylformamide, collectively referred to as Drying Control Chemical Additives. Both methods are regarded as expensive and, therefore, undesirable in routine glass production. An extensive description of a suitable sol-gel process, and of additives useful for improving the strength of sol-gel bodies, is contained in U.S. Pat. No. 5,240,488, which is incorporated herein in its entirety.

The cracking problem becomes more severe as the size of silica articles, preforms in the case of commercial fiber production, increases. State of the art optical fiber manufacture typically involves drawing hundreds of kilometers of fiber from a single preform. These preforms typically exceed 10 Kg in size. Although improvements in techniques for making large sol-gel bodies have been made, strength continues to be an issue and any process modification that results in improvement in the strength of intermediate products during the sol-gel process will constitute a valuable contribution to the technology.

SUMMARY OF THE INVENTION

We have developed a modified colloidal sol-gel process for making large sol-gel bodies of silica, and silica-containing, glasses. It relies in part on the use of vitreous silica particles, having essentially spherical shape and relatively large particle diameter, for preparing the sol mixture. We have demonstrated that by selectively designing the silica particle morphology, sol gel bodies with substantially improved characteristics can be produced. We define the desired particles as large, dense, spherical, vitreous (LDSV) particles. We have demonstrated improved sol-gel processing that is at least partly attributable to the use of LDSV particles in making the sol.

Conventional silica particle mixtures are manufactured by flame hydrolysis or by sol-gel techniques. In both cases the particles have significant void content, which is evidenced by a low particle mix density. Recently, silica particles have been manufactured by reheating particles produced by flame hydrolysis to a high temperature. This causes the particles to densify into relatively large particles with relatively smooth surface morphology and high density.

Sol-gel bodies formulated using starting colloids with these new silica particles exhibit strength improvements of 100%, and in some cases, 300%. The enhanced strength as well as higher loading allows more severe drying conditions to be used, thus allowing faster drying of the sol, and reducing overall processing time. The reduced surface area per gram also allows additives to be included in smaller amounts. This lowers the cost of materials and also decreases the process time required for burn-off of additives. These processing efficiencies translate into lower production cost, especially for very large bodies.

We have also recognized that a trade-off exists between the large loading factors possible when the sol is made with large spherical particles, and the tendency of the gel body to crack, as just discussed. We have found that gels formed with non-spherical particles form more cohesive networks and thus are less likely to crack. The optimum method, so far developed, uses a mixture of LDSV particles and non-spherical or aggregate particles. This produces a superior gel product from the standpoints of both shrinkage and cracking.

DETAILED DESCRIPTION

Figure 1:
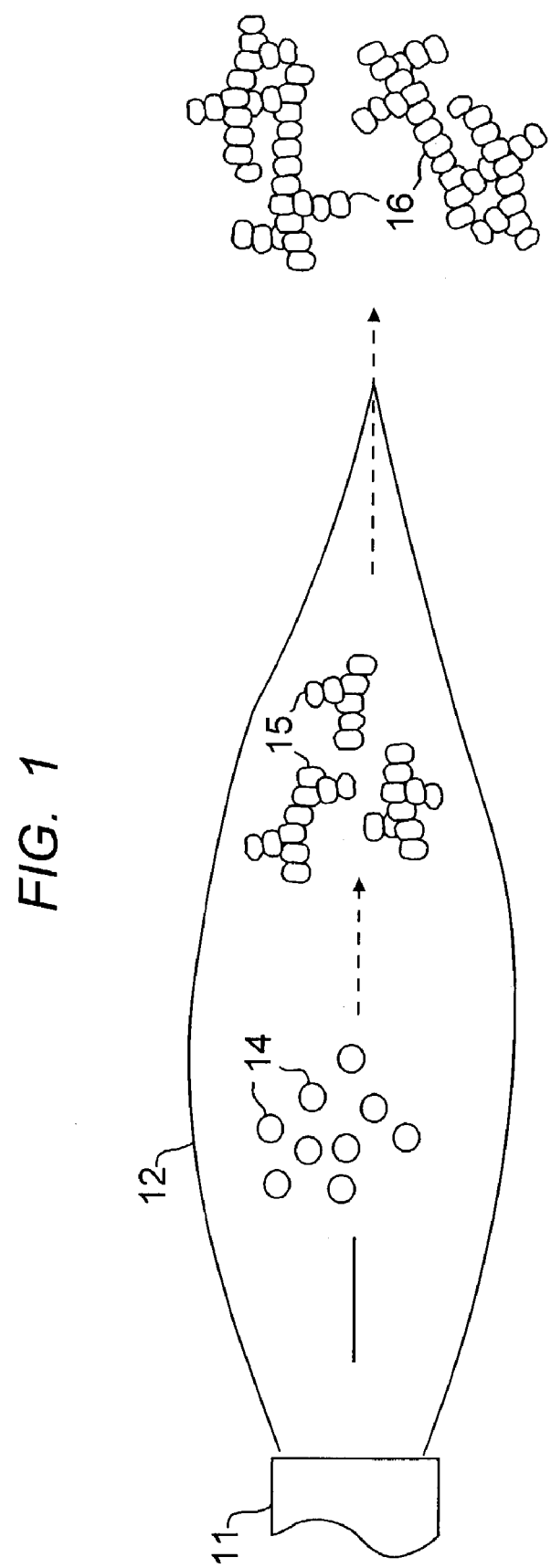
FIG. 1 is a schematic representation of the process stages in the production of fumed silica powder.

The invention is aimed at producing large sol-gel bodies. These may be used in a variety of applications, including making ultra-pure silica containers and crucibles. It is also applicable to the production of optical fiber preforms. The invention was demonstrated in the latter context, as will be described in detail below. However, it should be understood that it has much broader application.

A variety of optical fiber manufacturing techniques has been proposed. These begin with the production of a glass preform, which is then drawn into optical fiber by well-known draw techniques. Among the methods used in preform manufacture, the "rod-in-tube" process is effective and widely used. It involves inserting a core rod into an overcladding tube, typically made by a soot process, to produce a preform. As an alternative to the conventional soot process at least a portion of the preform may be produced by a sol-gel process. The sol-gel process can be used to form either the overcladding tube or the core rod, or both. Most typically, the full advantages of the sol-gel approach are realized in forming large bodies of silica, or silica containing glass, used for overcladding material. The silica bodies produced by the technique of the invention may be doped or undoped. When used for core rods, the silica may be pure, or may be up-doped with germania or equivalent dopant. The cladding material may be undoped, or may have portions that are down doped with fluorine.

When used as overcladding, a known approach is to insert the core rod into an unsintered cladding tube and consolidate the cladding tube onto the core rod. This approach, described in U.S. Pat. No. 4,775,401, issued Oct. 4, 1988, may be preferred since it avoids a separate sintering step thereby decreasing the total number of steps required. It also produces excellent preform symmetry thus reducing the risk of excess Polarization Mode Dispersion (PMD) in the finished fiber. An important requirement of the preform overcladding tube is dimensional stability and reproducibility. It should have an inner surface which is smooth and of uniform diameter so as to mate with the core. Both inside and outside diameter precision is desirable for controlling core-to-clad ratio in the drawn optical fiber.

For effective preform manufacture, as well as effective processes for forming other large silica bodies using sol-gel techniques, it is important to produce gel bodies with substantial wet (green body) strength, and minimal shrinkage. We have found that the use of large particulates of silica powder as the starting silica material contributes to attaining these and other goals. The size of these particulates is most conveniently defined in terms of the surface area of the silica powder, i.e. $m^2$ per gram. Large particles are defined here as 5–25 $m^2$ per gram.

We have also demonstrated that the particle morphology has a significant effect on the properties of sol-gel bodies. Improved results are produced using vitreous silica particles. Conventional silica particle mixtures are manufactured by flame hydrolysis or by sol-gel techniques. In both cases the particles have significant void content, which is evidenced by a low powder Tap density. Recently, silica particles have been manufactured by reheating fumed silica, or particles produced by flame hydrolysis, to a high temperature. This causes the particles to undergo transformation by fusing into to a vitreous state. In fusing, the surface of the particles is influenced by surface tension to form a relatively smooth, spherical, shape. This type of silica has only recently become available, and is described in German Patent DE 199 43 103 A 1. The particles in this new product are characterized by a relatively large average size, i.e. below 30 $m^2$/gm, a predominantly spherical shape, and a relatively smooth vitreous particle morphology. They have a nominal Tap density of greater than 30 gm/l, and more typically, greater than 40 gm/l.

Characteristic silica particles produced by flame hydrolysis (i.e. fumed silica) are irregular shaped aggregate bodies. The flame hydrolysis process is illustrated in FIG. 1, where the torch body is shown at 11 and the hydrogen flame is represented generally at 12. The reactants are typically $SiCl_4$, $SiHCl_3$, H, and air or oxygen. These are introduced in suitable proportion into the torch 11. The reaction produces fine silica dust, as shown at 14, in the hot zone of the flame. In a portion of the flame, or as the particles proceed to cooler regions of the flame, they aggregate into groups with a structure similar to that shown at 15. As they exit the flame the aggregates 15 agglomerate into large flake-like bodies shown at 16. These flake-like bodies are the final product. By the nature of the particle formation, it will be appreciated by those skilled in the art that mixtures of these particles, as well as the particles themselves, will have a relatively low density. Typical densities of mixtures of particles with this irregular morphology are below 25 gm/l.

Figure 2:
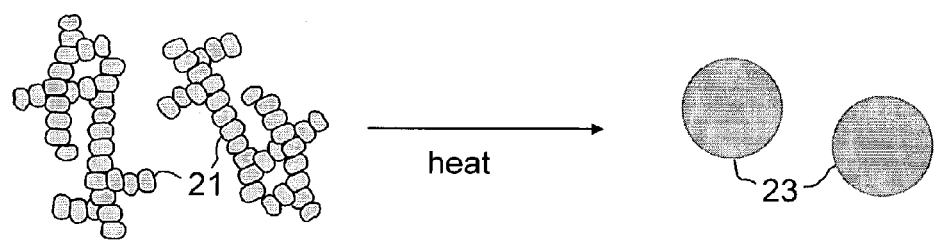
FIG. 2 is a schematic representation of the transformation of the particles produced by the process of FIG. 1 into LDSV particles.

When these silica aggregates (or other equivalent low density particle mixtures) are processed to at least partially melt the particles they are transformed into essentially spherical particles of higher density. This transformation is represented in FIG. 2 where the flake particles 21 are heated and transformed, as shown, into spherical particles 23. It should be understood that this transformation forms no part of this invention. It is the characteristic properties of the vitreous particles that are useful in the context of the invention.

In order to independently verify the morphological difference between the powders recommended for use with this invention, and those previously used and produced by fumed particle techniques (fumed silica), we prepared a series of electron micrographs as follows. The fumed silica with nominal surface area about 50 $m^2$/gm from suppliers such as Degussa Corp. was mixed with water so as to form a 2–3 wt % dispersion. A drop of this dispersion was placed on a carbon coated copper grid. After about a minute, the liquid was blotted off and the grid was dried and placed in a transmission electron microscope. The operating voltage was 200 KV, which allowed magnification factor of about 200,000. Several sections of the grid containing clusters of particles were imaged quickly so as to avoid any alteration by prolonged exposure to the electron beam. The micrographs were then analyzed carefully for particle size distribution and morphology (or shape). The sample size contained at least 500 random particles. The particles were as represented by FIG. 1, i.e. characterized by agglomerates of smaller particles. This was seen to be a consistent feature of several powder lots made over a period of 10 years, and hence can be considered to be a characteristic of the 50 $m^2$/gm fumed silica powder. The fumed silica particle mixtures are found to have Tap densities below 25 gm/l.

When the SE-1 or similar powders from Tokuyama Corp were analyzed as described above, it was seen that they had essentially 100% spherical particles. This was in marked contrast with the morphology of the 50 $m^2$/gm particles. The particles ranged in size from about 50 nm to 1 micron, with a Tap density above 40 gm/l.

The initial step in the sol-gel process is to intimately mix the vitreous silica particles in water, to create a solid-liquid colloidal dispersion. Commercial powders are sized by surface area per unit weight, typically $m^2$ per gram. The recommended size of the vitreous, spherical, silica particles according to the invention is 5–25 $m^2$/gram, and preferably 5 to less than 20 $m^2$/gm. This is an average particle size. Commercial powders are sized by surface area per unit weight, typically $m^2$ per gram. In silica powders rated at 5–20 $m^2$/gram, the particle size distribution will generally be in the range 0.15 to 1.0 microns.

Figure 3:
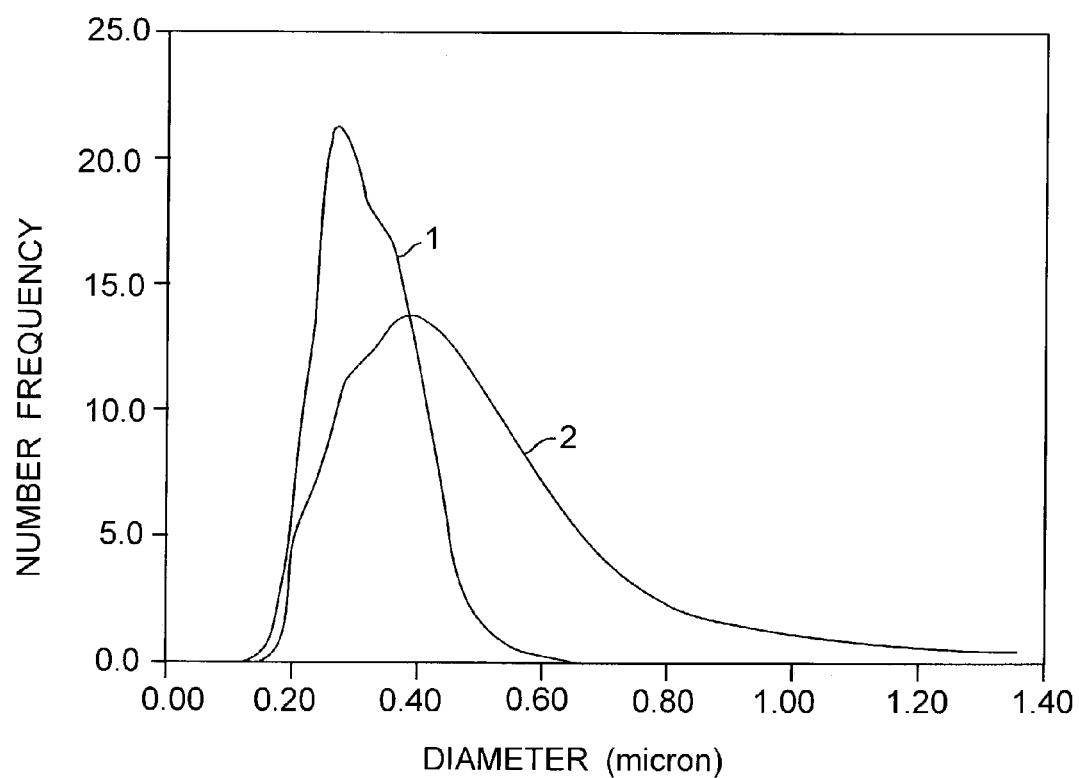
FIG. 3 is a distribution plot showing particle sizes for two suitable vitreous silica powder compositions according to the invention.

Distribution plots for two such powder mixtures are shown in FIG. 3. Curve 31 is for an experimental silica powder and is included as an example of a mixture with suitable particle size and distribution. Curve 32 shows size and distribution data for a silica powder product designated SE-1, available from Tokuyama Corp. The morphology of the particles in these mixtures compared with conventional silica powders are defined by examination of electron micrographs and found to be as represented in FIGS. 1 and 2.

In the sol-gel process the vitreous silica powder is dispersed in water to form the colloidal sol. A sol, as is well known in colloidal chemistry, is a dispersion of particulates that resembles a solution, but retains two distinct phases, in this case, liquid and solid. The solid particles remain suspended in the liquid by surface forces on the particles. Classic definitions of colloid particle size vary. The capability of a small particle to remain suspended in a liquid depends on many factors, the main ones being the nature of the dispersant, particularly the mass, and the nature of the dispersant, particularly the viscosity. The simplest way to prescribe sol systems useful for the invention are those in which the particulates remain suspended for a period sufficient to form a gel body. Particles in powders that are characterized by 5–18 $m^2$/gram are relatively large and would be expected to settle relatively rapidly in water. However, we have found, unexpectedly, that the settling of relatively large silica particles in water is hindered by the presence of smaller particles that are in stable suspension. Following this finding, we have developed a preferred embodiment of the invention wherein a portion of the particle mix in the starting colloid comprises the aggregate or flake particles of the prior art. Intuitively, it can be appreciated that the aggregate particles will settle more slowly than the relatively large spherical particles. The inclusion of aggregate particles aids in hindering particle settling of the whole mixture, and contributes to the large loading factors produced. We have also found, unexpectedly, that sol-gel bodies produced using an aggregate particle/vitreous particle mixture, evidence enhanced strength. We have also discovered that such gel bodies can be consolidated at temperatures below those expected. These results will be described in more detail below.

We formulated sol-gel bodies using colloidal suspensions of vitreous silica particles in the size range defined by 5–25 $m^2$ per gram, mixed with aggregate (non-spherical) silica particles ranging in size around 50 $m^2$ per gram, or, more generally, greater than 30 $m^2$ per gram. These mixed particle colloids can be made with high loading, i.e. over 60%, thus improving wet strength without impairing sol stability and rheology. Due to the large loading, shaped sol bodies in the "green" state more closely match the dimensions of the final desired form and thus allow for more complex shapes and greater dimensional control.

Figure 4:
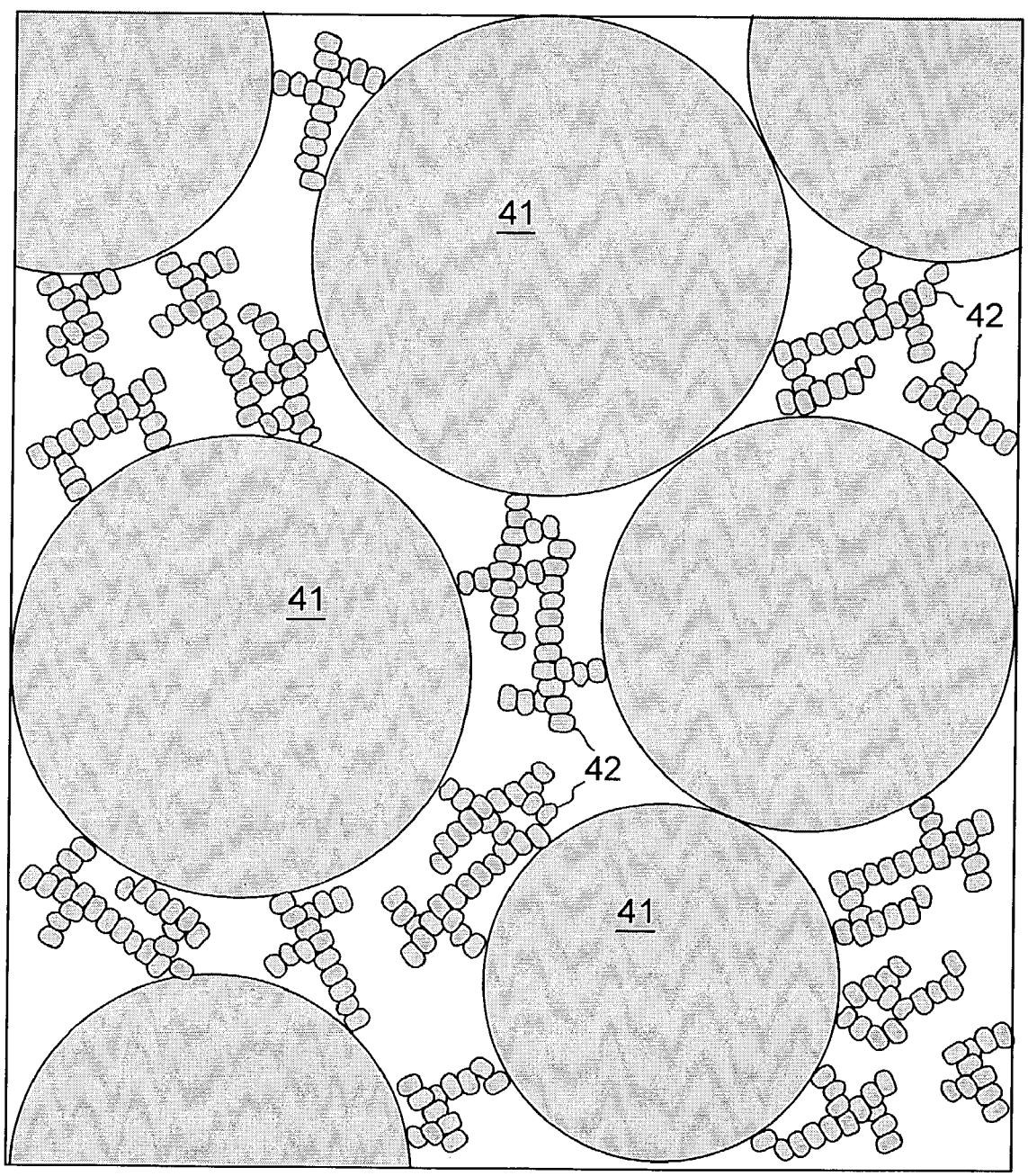
FIG. 4 is a schematic representation of a particle mixture according to a preferred embodiment of the invention.

The amount of aggregate particles in the particle mixture with vitreous particles in this preferred embodiment of the invention is in the range 10% to 90% by weight of the silica particle mixture, and preferably 25% to 70%. Alternatively, the mixture may be characterized in terms of the LDSV particle content, i.e. 10%–75%. It is postulated that the improved strength of gel bodies made with the mixed particle mixture may be attributed to the filling of interstices that normally occur in the LDSV powder mixture or colloid with the smaller aggregate particle. This increases the number of silica surfaces in contact and provides a denser network. The effect is illustrated schematically in FIG. 4, where the LDSV particles are shown at 41 and the aggregate particles at 42. It should be understood that these drawings are not necessarily to scale. For the purpose of illustration, the particles 41 in FIG. 4 are shown somewhat larger than they appear in FIG. 2.

In forming the water/silica powder suspension, thorough mixing is required. A standard high shear mixer is typically used, and the viscosity and time of mixing are important in achieving complete homogenization. (For details, see U.S. patent application Ser. No. 09/365,191 filed Aug. 2, 1999, which is incorporated herein by reference.) It is found that the use of the LDSV silica particles, according to the invention, substantially enhances dispersion and reduces mixing time.

The amount of silica particles in the water-based sol is preferably between 50% and 80% by weight. This range is suitable for LDSV particles alone, or in combination with aggregate particles (LDSV particles plus aggregate particles is 50%–80%). At the high end of this range loading is exceptionally high, and leads to important advantages for some applications, which will be identified below.

Figure 5:
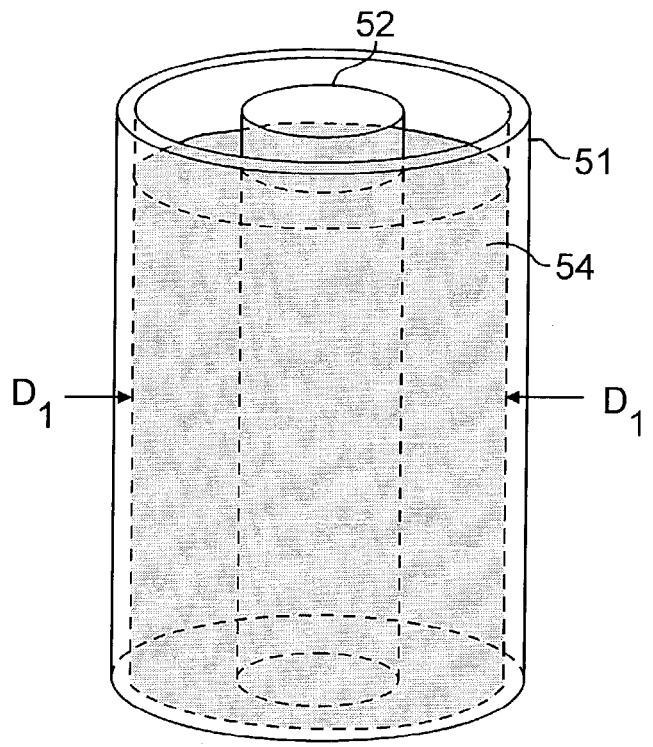
FIG. 5 is a schematic representation of a molding step used to produce a sol-gel body according to the invention.
Figure 6:
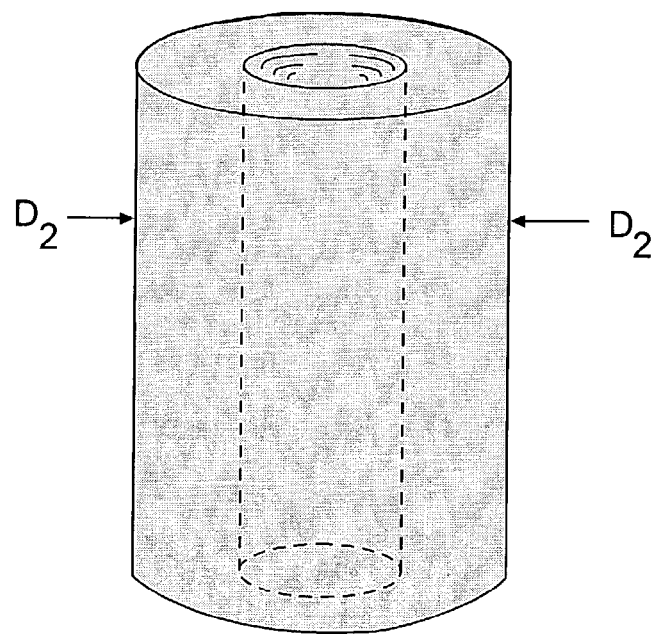
FIG. 6 is a view of the molded sol body after drying.

After thorough mixing of the silica particles in water, the pH of the mixture is adjusted, using a water-soluble base, to a pH level in the range 10–13, typically approximately 12. In the preferred procedure according to the invention the pH of the mixture is adjusted using tetramethylammonium hydroxide (TMAH). Other water soluble bases, e.g. tetraethylammonium hydroxide, or alkali hydroxides, may also be used. Due to the relatively large particles, and the lower surface area of the particles in suspension, an unexpectedly small amount of base is required to effect the pH adjustment. It is found that less than 2% by weight of TMAH is sufficient. The 2% by weight is a percentage based on the dry weight of silica. In some cases 1.5% or even 1.0% soluble base is adequate. The sol is then typically aged for several hours.

Additives, such as plasticizers and/or binders, can be added to the stabilized sol to impart a variety of desired characteristics. Typically these are organic materials that are burned off later in the process, i.e. heat treatment just prior to consolidation. A wide variety of additives have been proposed. Many of these are discussed in U.S. Pat. No. 5,240,488, referenced above. Included among the additives are polyamines, polyhydric alcohols, and glycerin. These additives aid in the preparation of the sol/gel but are frequently not desired in the final silica product. This is especially the case with optical fiber preforms. Consequently it is necessary to burn-off the organic additive while the body is porous, before consolidation. These additives typically impart their functionality in the gelation part of the process, providing enhancement by coating the surface of the silica particles. The amount of additive needed is therefore related to the surface area of the silica particles. As indicated in the patent referenced above, the recommended amount of additive is that sufficient to provide at least a single molecular layer (monomolecular layer) on a substantial portion of the surface area of the particles. Empirical data shows that complete coating of every particle is not necessary or even desired. Therefore the usual optimum amount is in the range of 5–50% of the total particle area. It will be appreciated by those skilled in the art that following this prescription in the context of the present invention will result in a lower amount of additive required. The reduction in additive is approximately equal to the reduced surface area ratio. The typical silica powder used in prior art sol-gel processes has a recommended surface area of 50 $m^2$/gram or more. The silica particle size according to this invention is in the range 5–18 $m^2$/gram. Using the area ratios, the amount of additive required in the process of the invention is 10–36% of that used in the prior art process. The reduction in additive used obviously results in a cost saving. However, more importantly, less organic additive needs to be removed from the gelled body later in the process. Reducing the firing time and/or severity by 3 to 10 times, as would result from using only 10–36% of the recommended amount of additive, leads to important process advantages.

The above-prepared sol was gelled by lowering the pH over several minutes. In the preferred process, this is achieved by adding 0.5–2%, typically 1%, of methyl formate (MF). Other aqueous esters or ester forming substances may also be used. The pH target is approximately 9. After adding the gelling agent, and before substantial gelling occurs, the sol is cast in the size and shape desired. An important advantage of the sol-gel process is that it can be used to form shaped glass bodies, and bodies with complex shapes, such as microstructured fiber (see U.S. Pat. No. 6,467,312), by simple molding of the gel. Since the gel is initially in a liquid state, it may be poured into a mold of the desired shape and gelled in situ.

FIG. 5 shows a mold adapted to forming a cylindrically shaped glass body. Again, it should be understood that, since dimensions in the drawing are not necessarily to scale, certain features may be exaggerated for clarity.

The objective of the specific embodiment to be described is to produce a relatively thick-walled structure suitable as an overcladding tube for an optical fiber preform. This embodiment is given by way of example only of a large variety of sizes and shapes in which silica bodies can be made according to the teachings of the invention.

In FIG. 5 the mold 51 is a cylindrically shaped vessel with a concentric center tube 52. The mold may comprise any suitable material such as stainless steel. After adding the gelling agent, and before substantial gelling occurs, the sol 54 (shown shaded) is cast into the space between the two concentric tubes. The inside diameter of the outer tube fixes the approximate outside diameter of the porous cladding tube and the outside diameter of the inside steel rod or tube determines the inside diameter of the porous cladding tube. The final dimensions of the consolidated cladding tube will be determined by the shrinkage of the gel upon drying and further shrinkage of the porous cladding tube during consolidation. These dimensional changes are well known, very reproducable, and are taken into account when designing the sol gel mold.

After the gel is formed, typically after 12–24 hours standing, the mold is removed. The "green" body is then dried for at least several days (typically 72–500 hours). The drying operation should take into account the shape of the body and avoid physical distortion of the shape due to gravity, especially in the early stages of drying. Cracking of the gel is a well-known problem. Handling the green gel body, and drying the gel, should be carried out carefully to avoid cracking.

The inherent "wet" strength of the gel, and drying shrinkage, are important process parameters, particularly when making bodies with large and/or complex shapes. It was found, unexpectedly, that the wet strength of gel bodies made with large vitreous silica particles, according to a feature of the invention, is enhanced, and in most cases, enhanced by more than 100%.

The use of relatively large vitreous particles is found to result in reduced propensity of the particles to agglomerate in the suspension. As a consequence, dramatically higher loading, up to 80% by weight, is possible. In conventional processing, attempts to load the sol with that much solid phase results in an unmanageable increase in viscosity. However, larger, spherical vitreous particles tend to aggregate less, and therefore flow more easily. The important consequence of load factors this high in the gel body is that there is a lower volume of dispersant to be removed in the drying step. Reducing the dispersant volume leads to two important results. One, the time required for the drying step, usually the most time consuming phase of the process, may be dramatically reduced. Two, because of very high loading of solids in the gel, the dimensions of the gel body are nearer to the dimensions of the final body, i.e. there is less shrinkage during drying. This not only reduces drying stress but also adds to dimensional control, that is, the final average dimensions more closely match those of the gel, but the relative dimensions of the body, i.e. those that determine the shape of the body, are preserved. This is illustrated in FIGS. 5 and 6 where the inside diameter $D_1$ of the mold, to take just one dimension, determines the outside diameter of the gel body. After drying, the diameter of the silica body in FIG. 6 corresponds to $D_2$. The ratio $D_2/D_1$ is the shrinkage factor. With sol loading greater than 65%, as compared to 50% in the typical prior art process, the shrinkage factor can be expected to be reduced by approximately 25% or more.

The dried porous body is heated slowly to a temperature above 600° C. and preferably approximately 1100° C. to burn out organic additives and to strengthen the material for further handling. In optical fiber applications, purification in a chlorine atmosphere is performed at this stage. As indicated above, the burn-out step may be considerably shortened, or the temperature required may be reduced, due to the reduced amount of additives added. At this point the tube has sufficient integrity to be handled but is still porous. The tube is then consolidated by heating the tube, typically to a temperature in the range 1200–1800° C.

In the preferred embodiment of the invention, where a portion of the silica particle mixture comprises prior art aggregate silica particles, some of the properties observed above will, as expected, fall between the characteristics of the prior art sol-gel process and product, and the process and product just described. However, in this case, in addition to the partial improvements expected from using the mixture, other improvements are found. For example, the temperature required for consolidation of the gel body is found to be reduced.

The following examples of sol-gel body production are given to illustrate the invention. In the examples, reference to commercial fumed silica aggregate particles refers to a product exemplified by Aerosil OX-50, a product of Degussa Corp. Reference to LDSV silica particles refers to a product exemplified by EXCELICA SE-1 or SX-03, both products of Tokuyama Corp.

EXAMPLE 1

A sol containing about 55 wt % commercial fumed silica aggregate particles with a nominal specific surface area of 50 $m^2/gm$ was made using 1.5 wt % tetramethylammonium hydroxide (TMAH) as a stabilizer. This was mixed with 1.75 wt % of methyl lactate, as the gelling agent. The sol was poured in to mold about 15 cm long and 1 cm in diameter. Gelling took place at room temperature in about 15 minutes. The gel was aged for about 3–24 hours and then extracted from the mold. The wet gel rod was then subjected to a MOR 3-point bend test, as stipulated by the ASTM standard C674–81. The typical modulus of rupture (MOR) was found to be about 0.07 MPa.

EXAMPLE 2

A sol containing about 65 wt % LDSV silica particles with a nominal specific surface area of ~15 $m^2/gm$ was made using 1.5 wt % tetramethylammonium hydroxide (TMAH) as a stabilizer. This was mixed with 1.75 wt % of methyl lactate as the gelling agent. The sol was poured in a mold about 15 cm long and 1 cm in diameter. The resultant cylindrical gel was aged for about 3–24 hours and then extracted from the mold. The wet gel rod was then subjected to a MOR 3-point bend test, as described above. The typical MOR was seen to be about 0.15 MPa. Furthermore, it was found that the maximum wet strength of the gels made of large particles is reached after only a few hours of aging. In comparison, gels made of 50 $m^2/gm$ particles require 12–24 hours to reach maximum wet strength. Since strengthening in this case is accompanied with significant syneresis which aids de-molding, aging times of gels made of large particles can be reduced by about 10–20 hours.

EXAMPLE 3

A sol containing about 75 wt % LDSV silica particles with a nominal specific surface area of ~15 $m^2/gm$ was made using 1.0 wt % tetramethylammonium hydroxide (TMAH) as a stabilizer. This was mixed with 1.2 wt % of methyl lactate as the gelling agent. The sol was poured in to mold about 15 cm long and 1 cm in diameter. The resultant cylindrical gel was aged for about 3–24 hours and then extracted from the mold. The wet gel rod was then subjected to a MOR 3-point bend test, as described above. The typical MOR was seen to be about 0.2 MPa.

EXAMPLE 4

A sol containing about 72 wt % LDSV silica particles with a nominal specific surface area of 15 $m^2/gm$ was made using 1.0 wt % tetramethylammonium hydroxide (TMAH) as a stabilizer. This was mixed with 1.2 wt % of methyl lactate as the gelling agent. The sol was poured in to a mold about 50 cm long and 16 cm ID. A mandrel, 3 cm OD, was used to define the inner bore. Upon aging the gel for about 5 hours, it was extracted from the mold and placed in the drier. For drying, the initial conditions were 75% RH and 21° C.; gradually the humidity was lowered and temperature, increased to finish the drying in about 6 days. For comparison, drying time of a comparable body made with 50 $m^2/g$ silica particles requires an estimated 30 days.

EXAMPLE 5

The samples made as described in Example 2 and 3 were dried at 30% RH and room temperature for about 1 day. The dried rods were placed in a furnace and heated to remove the organics. Nitrogen was used up to about 350° C. to avoid explosive atmospheres, at which point air was substituted. Eventually, the dried gels were purified in 10 vol % $Cl_2$ at 1000° C. and cooled. They were then sintered to complete transparency at 1500° C. in flowing He in about 0.5 h.

EXAMPLE 6

A solution of 1.183 kg of deionized water, and 0.041 kg of TMAH were placed into a the disperser. High shear mixing was commenced at a tip speed of about 12 m/sec. 5.47 kg of LDSV silica particles having a nominal surface area of 5 $m^2/g$, was added to the disperser after initiation of the shear mixing. Mixing was performed for about 65 minutes, after which time, an additional 0.032 kg of TMAH, and 0.5 kg water was added, without ceasing the mixing. The resultant sol exhibited a low shear viscosity of about 60 cP, and a pH of about 11.5

With the exception of EXAMPLE 1, the predominant form of silica particles in these examples is LDSV. Typically at least 60% of the particles, and preferably at least 80%, are LDSV.

In the preferred embodiment described earlier, the vitreous particles are mixed with low density particles, for example, aggregate silica particles. The effect of mixing LDSV silica particles with aggregate silica particles is shown in the following examples. It was discovered that the properties of the sol and resulting gel can be tuned by adjusting the ratio of LDSV particles to aggregate particles. This leads, inter alia, to gel body sizes previously unattainable.

EXAMPLE 7

Deionized water in an amount of 15.88 kg and 0.23 kg of TMAH were placed into a high shear disperser. High shear mixing was commenced at a tip speed of about 22 m/sec. Silica aggregate particles having a nominal surface area of 50 $m^2/g$, in an amount of 30 kg, was added gradually, over about 1 hour, after initiation of the shear mixing. When the powder addition was completed, the pH of the mixture was about 10. Mixing was performed for about 90 minutes. After this mixing period, an additional 1.65 kg of TMAH and 19.74 kg of water was added, without ceasing the mixing, and mixing was continued for an additional 20 minutes.

The resultant 45 wt. % $SiO_2$ sol was allowed to fully age (~1 week). 31.8 kg of this aged dispersion was placed into a high shear disperser. High shear mixing was performed as before. 27 kg of LDSV silica having a nominal surface area of 15 $m^2/g$, was added to the disperser and mixed for about 45 minutes. After mixing, an additional 13 kg of the aged silica aggregate dispersion, 6.9 kg of water and 0.7 kg of polymer solution, was added without ceasing mixing, and mixing continued for about 10 additional minutes. Of the silica particles in this mixture approximately 54% by weight are LDSV.

Tubular gel bodies were cast by adding a pH-lowering gelling agent—e.g. methyl formate or another water-soluble hydrolysable ester—to the sol. Strength measurements were performed on the gelled bodies (a) about 24 hrs after gelation occurred and (b) after the wet gel bodies were dried to about 50% of their original weight. Four properties were calculated from the time, force and displacement to break data thus characterizing gel body strength. These properties are (1) MOR, (2) Elastic Modulus, (3) Energy to Break and (4) Maximum Strain. Typical values obtained from wet gel bodies made with mixed silica particles are as follows: MOR of 0.16 MPa, Elastic Modulus of 12.7 MPa, Energy to Break of 2.29 N-mm and Maximum Strain of 2.18%.

EXAMPLE 8

19 kg of a fully aged 46 wt. % sol with aggregate silica particles was placed into the disperser. High shear mixing was commenced at a tip speed of about 17 m/sec. 13.5 kg of LDSV silica particles having a nominal surface area of 15 $m^2/g$, was added to the disperser. Mixing was performed for about 45 minutes. After this mixing period, an additional 3 kg of water, 0.16 kg of polymer solution and 0.18 kg of Tris (2-aminoethyl)amine was added, without ceasing the mixing, and mixing was continued for about 15 additional minutes. Then 0.76 kg methyl acetate, a gellation agent was added and mixing continued for 1 additional minute. Of the silica particles in this mixture approximately 34% by weight are LDSV. The sol was then pumped into a mold and allowed to gel. Results were comparable to those reported in Example 6.

Figure 7:
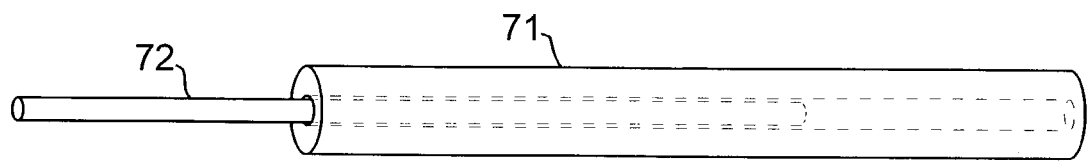
FIGS. 7 and 8 are schematic views of a the rod-in-tube process, taking advantage of a cladding tube fabrication technique according to the invention.
Figure 8:
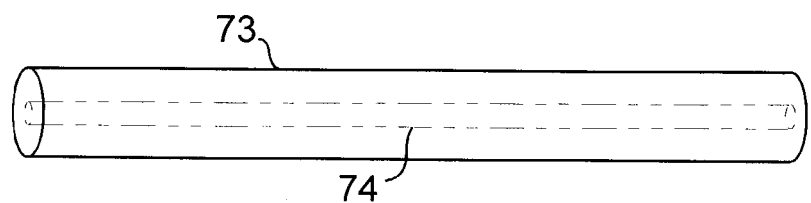

The foregoing examples illustrate the production of sol gel bodies useful for example for optical fiber cladding tubes. These are used in a rod-in-tube process that is illustrated in FIGS. 7 and 8. As indicated earlier the drawing is not to scale. The cladding tube shown in FIGS. 5 and 6 is shown with an abbreviated length. A cladding tube more representative of dimensions actually used is shown in FIG. 7 at 71. A typical length to diameter ratio is 10–15. The core rod 72 is shown being inserted into the cladding tube. The rod and/or the tube at this point may be either already consolidated or still porous. Typically the jacketing tube is porous and is consolidated around the core rod. There exist several common options for the composition of the core rod. It may be pure silica, adapted to be inserted into a down doped cladding tube. It may have a pure silica center region with a down doped outer core region. It may have an up-doped, e.g. germania doped, center core region surrounded by a pure silica region. It may have an up-doped center core region surrounded by a down doped outer core region. All of these options are well known in the art and require no further exposition here. After assembly of the rod 71 and tube 72, the combination is sintered to produce the final preform 73 shown in FIG. 8, with the core 74 indistinguishable from the cladding except for a small refractive index difference.

Figure 9:
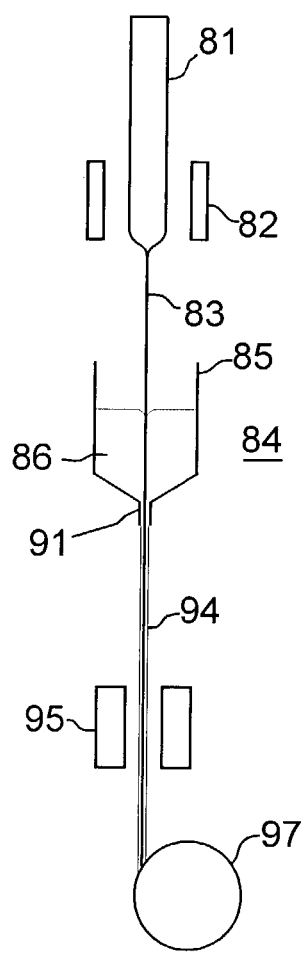
FIG. 9 is a schematic representation of a fiber drawing apparatus useful for drawing preforms made by the invention into continuous lengths of optical fiber.

The consolidated perform is then used for drawing optical fiber in the conventional way. FIG. 9 shows an optical fiber drawing apparatus with preform 81, and susceptor 82 representing the furnace (not shown) used to soften the glass preform and initiate fiber draw. The drawn fiber is shown at 83. The pristine fiber surface is then passed through a coating cup, indicated generally at 84, which has chamber 85 containing a coating prepolymer 86. The liquid coated fiber from the coating chamber exits through die 91. The combination of die 91 and the fluid dynamics of the prepolymer, controls the coating thickness. The prepolymer coated fiber 94 is then exposed to UV lamps 95 to cure the prepolymer and complete the coating process. Other curing radiation may be used where appropriate. The fiber, with the coating cured, is then taken up by take-up reel 97. The take-up reel controls the draw speed of the fiber. Draw speeds in the range typically of 1–30 m/sec. can be used. It is important that the fiber be centered within the coating cup, and particularly within the exit die 91, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus is FIG. 9 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 μm in diameter, with approximately 240 μm standard.

The process described herein is especially useful for producing large sol-gel optical fiber preforms. Large sol-gel bodies in current commercial parlance means bodies with a weight greater than 6 Kg, typically with a diameter greater than 50 mm, and frequently greater than 75 mm. The invention is also well adapted for producing smaller and lighter silica bodies but which heretofore have, proved difficult to make because of the shape of the body. It will be intuitively understood that an elongated silica body, or an odd shaped silica body (for instance, a crucible), having at least one dimension of, for example, 16 inches could present at least the same challenge as a 6 Kg, or even 20 Kg, body with a compact shape.

Reference herein to silica bodies means, in the case of optical fiber or other articles demanding preforms, highly pure silica bodies. The silica base material for optical fiber preforms excludes impurities such as water or transition metal ions at a ppb level. They may however, include small amounts of dopants, such as fluorine, for modifying refractive index. Other kinds of silica bodies may include significant amounts of glass forming oxides or other additives. The term silica body is intended to refer to a body in which the predominant ingredient, more than 50% by weight, is silica.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. Process for the manufacture of a glass body comprising:
   (a) preparing a sol by mixing silica particles and water, the silica particles containing at least 10% by weight of large, spherical, vitreous particles, (b) adding a water soluble base to adjust the pH of the sol, (c) adding a gelling agent to the sol, (d) casting the sol into a mold, (e) gelling the sol in the mold to form a gelled body in the shape of the mold, (f) removing the gelled body from the mold, and (g) firing the gelled body to consolidate the gelled body into a vitreous silica body.

2. The process of claim 1 wherein the water soluble base is selected from the group consisting of tetramethylammonium hydroxide and tetraethylammonium hydroxide.

3. The process of claim 1 wherein the water soluble base is added in the amount of less than 2% by weight based on the weight of silica particles.

4. The process of claim 1 wherein the sol contains at least one organic additive in sufficient quantity to monomolecularly coat from 5% to 50% of the total free surface of the silica particles.

5. The process of claim 1 wherein the silica particles contain at least 25% by weight of large, spherical, vitreous particles.

6. The process of claim 1 wherein the silica particles contain at least 10% by weight of aggregate particles.

7. The process of claim 6 wherein the silica particles contain at least 25% by weight of aggregate particles.

8. Process for the manufacture of optical fiber preforms comprising: (a) preparing a porous silica body of silica particles, said porous silica body having a weight greater than 5 kg, by the steps of: (i) preparing a sol by mixing silica particles and water, the silica particles containing at least 10% by weight of large, spherical, vitreous particles, with the ratio by weight of silica particles to water being greater than 50%, (ii) adding a water soluble base to adjust the pH of the sol to a value in the range 10–13, (iii) adding a gelling agent to the sol, (iv) casting the sol into a mold, (v) gelling the sol in the mold to form a gelled body in the shape of the mold, and (vi) removing the gelled body from the mold, (b) heating the porous silica body at a temperature greater than 1300.degree. C. to consolidate the porous silica body into a preform.

9. Process for the manufacture of optical fiber comprising:
   (a) preparing a porous silica body of silica particles, said porous silica body having a weight greater than 5 kg, by the steps of: (i) preparing a sol by mixing silica particles and water, the silica particles containing at least 10% by weight of large, spherical, vitreous particles, with the ratio by weight of silica particles to water being greater than 50%, (ii) adding a water soluble base to adjust the pH of the sol to a value in the range 10–13, (iii) adding a gelling agent to the sol, (iv) casting the sol into a mold, (v) gelling the sol in the mold to form a gelled body in the shape of the mold, and (vi) removing the gelled body from the mold, (b) heating the porous silica body at a temperature greater than 1300 degree. C. to consolidate the porous silica body into a preform, (c) mounting the preform in a fiber draw apparatus, and (d) drawing optical fiber from the preform.

10. The process of claim 9 wherein the water soluble base is selected from the group consisting of tetramethylammonium hydroxide and tetraethylammonium hydroxide.

11. The process of claim 10 wherein the water soluble base is added in the amount of less than 2% by weight based on the weight of silica particles.

12. The process of claim 9 wherein the sol contains at least one organic additive in sufficient quantity to monomolecularly coat from 5% to 50% of the total free surface of the silica particles.

13. The process of claim 9 where the large, spherical, vitreous silica particles have a surface area of less than 20 $m^2$ per gram.

14. The process of claim 9 wherein the silica particles contain at least 25% by weight of large, spherical, vitreous particles.

15. The process of claim 9 wherein the silica particles contain at least 10% by weight of aggregate particles.

16. The process of claim 9 wherein the silica particles contain at least 25% by weight of aggregate particles.

* * * * *